United States Patent
Ho et al.

(10) Patent No.: US 10,276,199 B1
(45) Date of Patent: Apr. 30, 2019

(54) HIGH THERMAL GRADIENT HEATSINK FOR HEAT ASSISTED MAGNETIC RECORDING MEDIA

(71) Applicant: WD Media, LLC, San Jose, CA (US)

(72) Inventors: Hoan Cong Ho, San Jose, CA (US); Tomoko Seki, Sunnyvale, CA (US); Paul C. Dorsey, Los Altos, CA (US); Antony Ajan, San Jose, CA (US)

(73) Assignee: WD MEDIA, LLC, San Jose, CA (US)

( * ) Notice: Subject to any disclaimer, the term of this patent is extended or adjusted under 35 U.S.C. 154(b) by 180 days.

(21) Appl. No.: 15/197,483

(22) Filed: Jun. 29, 2016

(51) Int. Cl.
*G11B 5/66* (2006.01)
*G11B 5/65* (2006.01)
*G11B 5/84* (2006.01)
*G11B 5/00* (2006.01)

(52) U.S. Cl.
CPC .............. *G11B 5/65* (2013.01); *G11B 5/8404* (2013.01); *G11B 2005/0021* (2013.01)

(58) Field of Classification Search
CPC ......... G11B 5/73; G11B 5/732; G11B 5/7325; G11B 5/738; G11B 2005/0021
See application file for complete search history.

(56) References Cited

U.S. PATENT DOCUMENTS

| | | |
|---|---|---|
| 6,623,974 B1 | 9/2003 | Kanbe et al. |
| 8,173,282 B1 | 5/2012 | Sun et al. |
| 8,509,039 B1 | 8/2013 | Huang et al. |
| 8,565,050 B1 | 10/2013 | Bertero et al. |
| 8,570,844 B1 | 10/2013 | Yuan et al. |
| 8,576,672 B1 | 11/2013 | Peng et al. |
| 8,605,555 B1 | 12/2013 | Chernyshov et al. |
| 8,743,666 B1 | 6/2014 | Bertero et al. |
| 8,811,129 B1 | 8/2014 | Yuan et al. |
| 8,867,322 B1 | 10/2014 | Chernyshov et al. |
| 8,941,950 B2 | 1/2015 | Yuan et al. |
| 9,001,630 B1 | 4/2015 | Bertero et al. |
| 9,034,492 B1 | 5/2015 | Mallary et al. |
| 9,047,880 B1 | 6/2015 | Bertero et al. |
| 9,177,585 B1 | 11/2015 | Seki et al. |
| 9,406,329 B1 | 8/2016 | Ho et al. |
| 9,697,859 B1 * | 7/2017 | Tripathy ............... G11B 5/7013 |
| 2002/0064691 A1 * | 5/2002 | Kanbe .................... G11B 5/656 428/839.1 |
| 2003/0087131 A1 * | 5/2003 | Oikawa .................... G11B 5/65 428/832 |

(Continued)

OTHER PUBLICATIONS

U.S. Appl. No. 13/206,071, filed Aug. 9, 2011. "Heat Assisted Magnetic Recording Media Having a RuAl Based Interlayer."

(Continued)

*Primary Examiner* — Holly C Rickman
(74) *Attorney, Agent, or Firm* — Loza & Loza, LLP; Gabriel Fitch (57) ABSTRACT

High thermal gradient heatsinks for heat assisted magnetic recording media are provided. One example magnetic recording medium for heat assisted magnetic recording includes a substrate, a first seed layer on the substrate, a heatsink layer on the first seed layer and including Ru having a crystal texture of (11.0), a second seed layer on the heatsink layer, and a magnetic recording layer on the second seed layer. Methods for manufacturing such magnetic recording media are also disclosed.

20 Claims, 9 Drawing Sheets

| Seedlayer (402) | Lattice constant (404) | | Lattice misfit with Ru(11.0) -1 (%) (406) | Lattice misfit with Ru(11.0) -2 (%) (408) |
|---|---|---|---|---|
| | a (Å) | √2 x a (Å) | | |
| W | 3.16 | 4.46 | -5.2 | 4.0 |
| Mo | 3.15 | 4.45 | -5.1 | 4.0 |
| RuTi | 3.07 | 4.34 | -8.1 | 1.4 |
| CoHf | 3.16 | 4.47 | -4.9 | 4.3 |
| CoZr | 3.19 | 4.51 | -4.0 | 5.1 |
| RuHf | 3.23 | 4.57 | -2.6 | 6.3 |
| RuZr | 3.25 | 4.60 | -2.0 | 7.0 |
| TiC | 4.33 | — | -7.7 | 1.2 |
| TaN | 4.33 | — | -7.7 | 1.2 |
| TaC | 4.45 | — | -5.1 | 4.0 |
| NbC | 4.46 | — | -4.9 | 4.2 |
| ZrN | 4.59 | — | -2.1 | 7.2 |
| ZrC | 4.69 | — | 0.0 | 9.6 |

400

(56) References Cited

U.S. PATENT DOCUMENTS

2004/0213991 A1 10/2004 Matsuda et al.
2012/0251842 A1 10/2012 Yuan et al.

OTHER PUBLICATIONS

U.S. Appl. No. 14/865,501, filed Sep. 25, 2015. "Heat Assisted Magnetic Recording (HAMR) Media with Curie Temperature Reduction Layer."
U.S. Appl. No. 14/935,337, filed Nov. 6, 2015. "Thermal Barrier Layers and Seed Layers for Control of Thermal and Structural Properties of HAMR Media."
U.S. Appl. No. 15/136,195, filed Apr. 22, 2016. "Heat-Assisted Magnetic Recording (HAMR) Medium Including a Split Heat-Sink Structure (SHSS)."
U.S. Appl. No. 15/089,145, filed Apr. 1, 2016. "Heat-Assisted Magnetic Recording (HAMR) Medium Including a Bi-Layer That Enables Use of Lower Laser Current in Write Operations."
U.S. Appl. No. 14/299,873, filed Jun. 9, 2014. "Heat Sink for Heat Assisted Magnetic Recording Media."
U.S. Appl. No. 13/769,232, filed Feb. 15, 2013. "HAMR Media Struture Having an Anisotropic Thermal Barrier Layer."

\* cited by examiner

| Seedlayer | Lattice constant | | Lattice misfit with Ru(11.0) -1 (%) | Lattice misfit with Ru(11.0) -2 (%) |
|---|---|---|---|---|
| | a (Å) | √2 x a (Å) | | |
| W | 3.16 | 4.46 | -5.2 | 4.0 |
| Mo | 3.15 | 4.45 | -5.1 | 4.0 |
| RuTi | 3.07 | 4.34 | -8.1 | 1.4 |
| CoHf | 3.16 | 4.47 | -4.9 | 4.3 |
| CoZr | 3.19 | 4.51 | -4.0 | 5.1 |
| RuHf | 3.23 | 4.57 | -2.6 | 6.3 |
| RuZr | 3.25 | 4.60 | -2.0 | 7.0 |
| TiC | 4.33 | — | -7.7 | 1.2 |
| TaN | 4.33 | — | -7.7 | 1.2 |
| TaC | 4.45 | — | -5.1 | 4.0 |
| NbC | 4.46 | — | -4.9 | 4.2 |
| ZrN | 4.59 | — | -2.1 | 7.2 |
| ZrC | 4.69 | — | 0.0 | 9.6 |

HIGH THERMAL GRADIENT HEATSINK FOR HEAT ASSISTED MAGNETIC RECORDING MEDIA

BACKGROUND

In heat assisted magnetic recording (HAMR) technology, an FePt based recording medium may be heated to above its Curie temperature (Tc) using a laser. The laser generated heat may be guided to the medium using a near-field transducer (NFT) placed near the inductive write head. As the medium cools, writing is then carried out during the refreezing process. Because the bit transitions are determined by the thermal gradients, as opposed to just the write field gradients, much higher linear/track densities can be achievable with HAMR as opposed to previous magnetic recording technologies.

HAMR media performance, including the high linear/track densities, is largely determined by the thermal gradient which originates from proper heat sinking design in media stack. Ruthenium (Ru) which has relatively high thermal conductivity ($k_{th}$) is a good material for the heatsink, but its hexagonal close-packed (HCP) crystal structure and rough surface make it difficult to establish epitaxial growth with cubic crystal structure based interlayers (for example, MgO) and above FePt recording films.

DETAILED DESCRIPTION

Referring now to the drawings, embodiments of systems and methods for providing high thermal gradient heatsinks for heat assisted magnetic recording media are illustrated. One example system involves a magnetic recording medium for heat assisted magnetic recording where the medium includes a substrate, a first seed layer on the substrate, a heatsink layer on the first seed layer and including Ru having a crystal texture of (11.0), a second seed layer on the heatsink layer, and a magnetic recording layer on the second seed layer. Methods for manufacturing such magnetic recording media are also disclosed. In one aspect, these designs can allow direct growth of MgO onto a Ru heatsink and beneficially bring the magnetic film closer to the heatsink to improve media thermal gradient.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Figure 1:
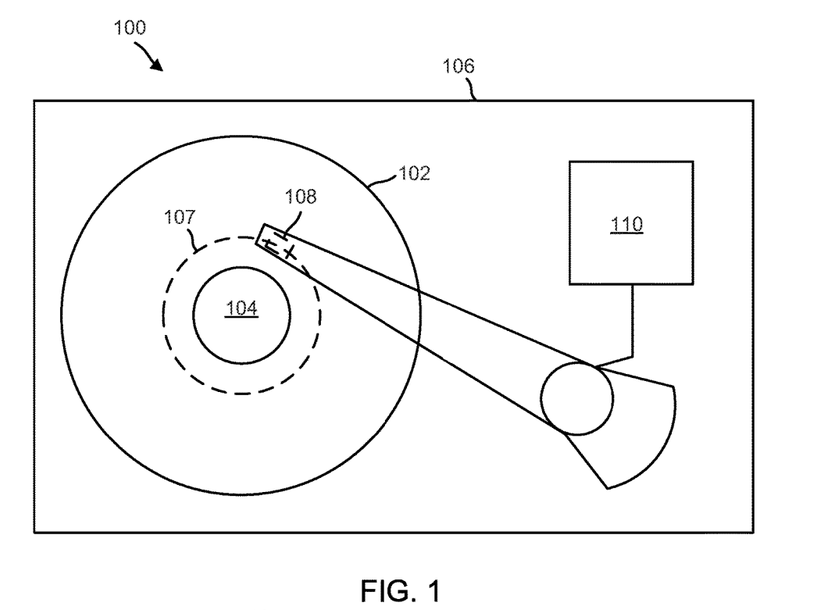
FIG. 1 is a top schematic view of a disk drive configured for heat assisted magnetic recording (HAMR) including a magnetic medium having a heatsink configured to provide a high thermal gradient in accordance with one embodiment of the disclosure.

FIG. 1 is a top schematic view of a disk drive 100 configured for heat assisted magnetic recording (HAMR) including a magnetic medium having a heatsink configured to provide a high thermal gradient in accordance with one embodiment of the disclosure. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In an alternative embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
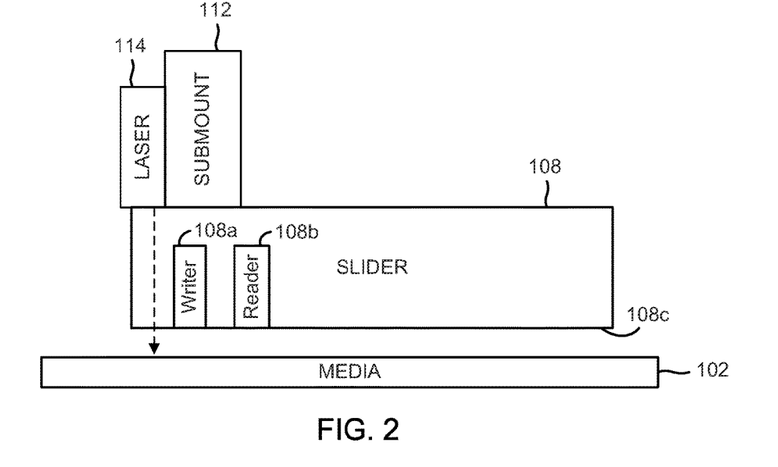
FIG. 2 is a side schematic view of the slider and HAMR magnetic medium of FIG. 1 with the heatsink configured to provide the high thermal gradient in accordance with one embodiment of the disclosure.

FIG. 2 is a side schematic view of the slider and HAMR magnetic medium of FIG. 1 with the heatsink configured to provide the high thermal gradient in accordance with one embodiment of the disclosure. The HAMR system components also include a sub-mount 112 attached to a top surface of the slider 108. The laser 114 is attached to the sub-mount 112, and possibly to the slider 108. The slider 108 includes the write element (e.g., writer) 108a and the read element (e.g., reader) 108b positioned along an air bearing surface (ABS) 108c of the slider for writing information to, and reading information from, respectively, the media 102.

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 near the write element 108a. FIGS. 1 and 2 illustrate a specific embodiment of a HAMR system. In other embodiments, the HAMR magnetic medium 102 with the heatsink configured to provide the high thermal gradient can be used in other suitable HAMR systems.

Figure 3:
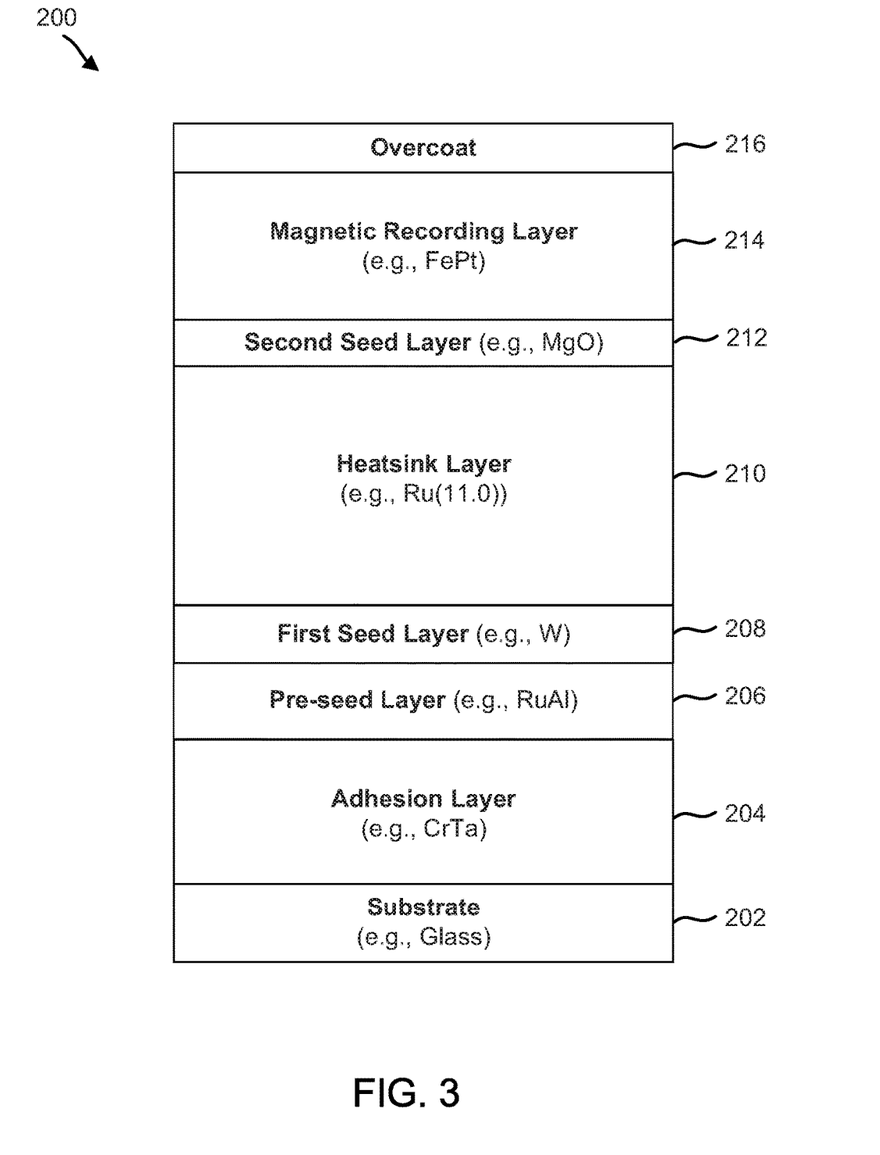
FIG. 3 is a side schematic view of a HAMR magnetic medium with a heatsink configured to provide a high thermal gradient in accordance with one embodiment of the disclosure.

FIG. 3 is a side schematic view of a HAMR magnetic medium 200 with a heatsink 210 configured to provide a high thermal gradient in accordance with one embodiment of the disclosure. In sequence from the bottom, the medium 200 includes a substrate 202, an adhesion layer 204, a pre-seed layer 206, a first seed layer 208, a heatsink layer made of Ru (11.0) 210, a second seed layer 212, a magnetic recording layer (MRL) 214, and an overcoat layer 216. In one embodiment, the medium 200 may also include a buffer layer between the heatsink layer 210 and the second seed layer 212. In one embodiment, the medium 200 may also include a capping layer between the MRL 214 and the overcoat 216. In one embodiment, the medium 200 may also include a lubricant layer on the overcoat 216.

The substrate 202 can be made of one or more materials such as an Al alloy, NiP plated Al, glass, glass ceramic, and/or combinations thereof. In one embodiment, the substrate 202 is a glass substrate having a diameter of about 97 millimeters or less. In other embodiments, the diameter may vary.

The adhesion layer 204 can include one or more materials such as CrTa, CrTi, NiTa, combinations thereof, and/or other suitable materials known in the art.

The pre-seed layer 206 can be made of one or more materials such as RuAl. In several embodiments, the pre-seed layer 206 can act as a seed layer for the first seed layer 208. In one embodiment, the pre-seed layer can be made of one or more materials with a B2 crystal structure.

Figure 5:
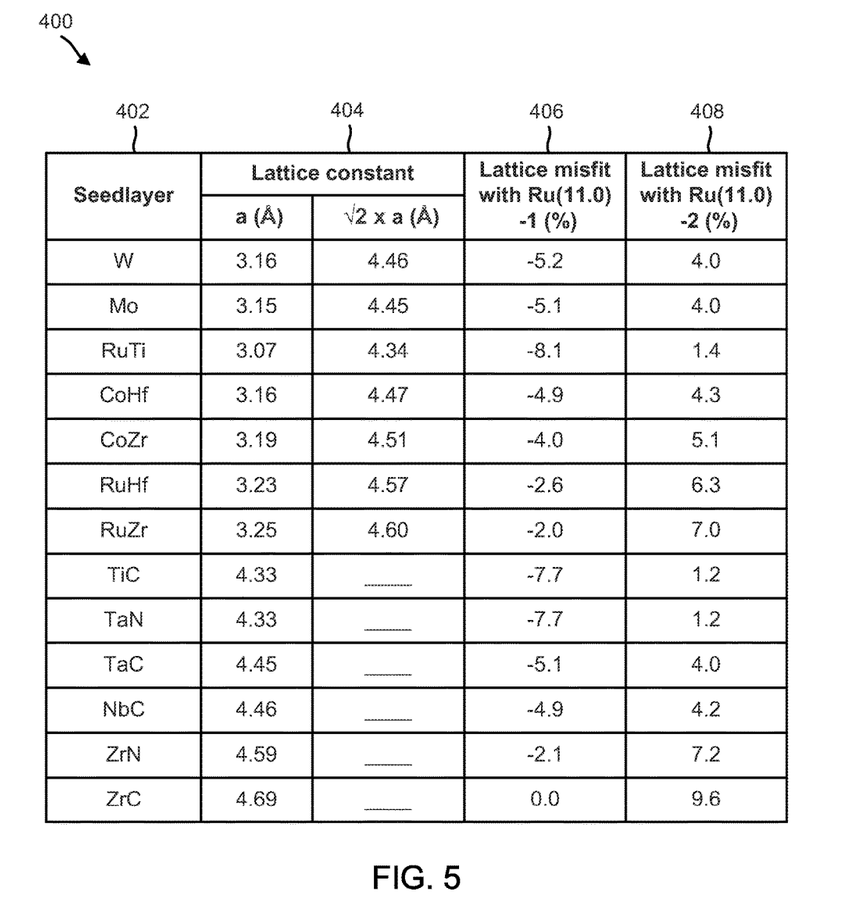
FIG. 5 is a table illustrating possible seed layer materials for a heatsink layer configured to provide a high thermal gradient and corresponding seed layer characteristics such as lattice constant and lattice mismatch with the heatsink layer in accordance with one embodiment of the disclosure.

The first seed layer 208 can be made of one or more materials such as W—X, Mo, Mo—Y, Cr—Z, RuTi, CoHf, CoZr, RuHf, RuZr, TiC, TaN, TaC, NbC, ZrN, ZrC, and/or combinations thereof. In such case, X can be Ru, Cr, and/or Mo, Y can be Ru and/or Cr, and Z can be Ru and/or Mo. In several embodiments, the first seed layer 208 has a preselected crystal texture configured to facilitate growth of the crystal texture of the heatsink layer 210. In one embodiment, the first seed layer 208 is made of one or more materials having a characteristic such as a body center cubic (BCC) crystal structure, a B2 crystal structure, and/or a NaCl crystal structure. In one aspect, the materials of the first seed layer can have a (002) crystal texture. Possible materials for the first seed layer and their corresponding characteristics are illustrated in FIG. 5, which will be discussed in greater detail below. In one aspect, the first seed layer may be made of one or more materials having a characteristic such as (1) a body center cubic (BCC) crystal structure with a lattice constant greater than, or equal to, 3.02 Angstroms and less than, or equal to, 3.32 Angstroms, (2) a B2 crystal structure with a lattice constant greater than, or equal to, 3.02 Angstroms and less than, or equal to, 3.32 Angstroms, and/or (3) a NaCl crystal structure with a lattice constant greater than, or equal to, 4.28 Angstroms and less than, or equal to, 4.69 Angstroms. In one embodiment, the first seed layer 208 can be made of W having a crystal texture of (002). In several embodiments, the first seed layer 208 acts as a seed layer for the heatsink layer 210.

Figure 4:
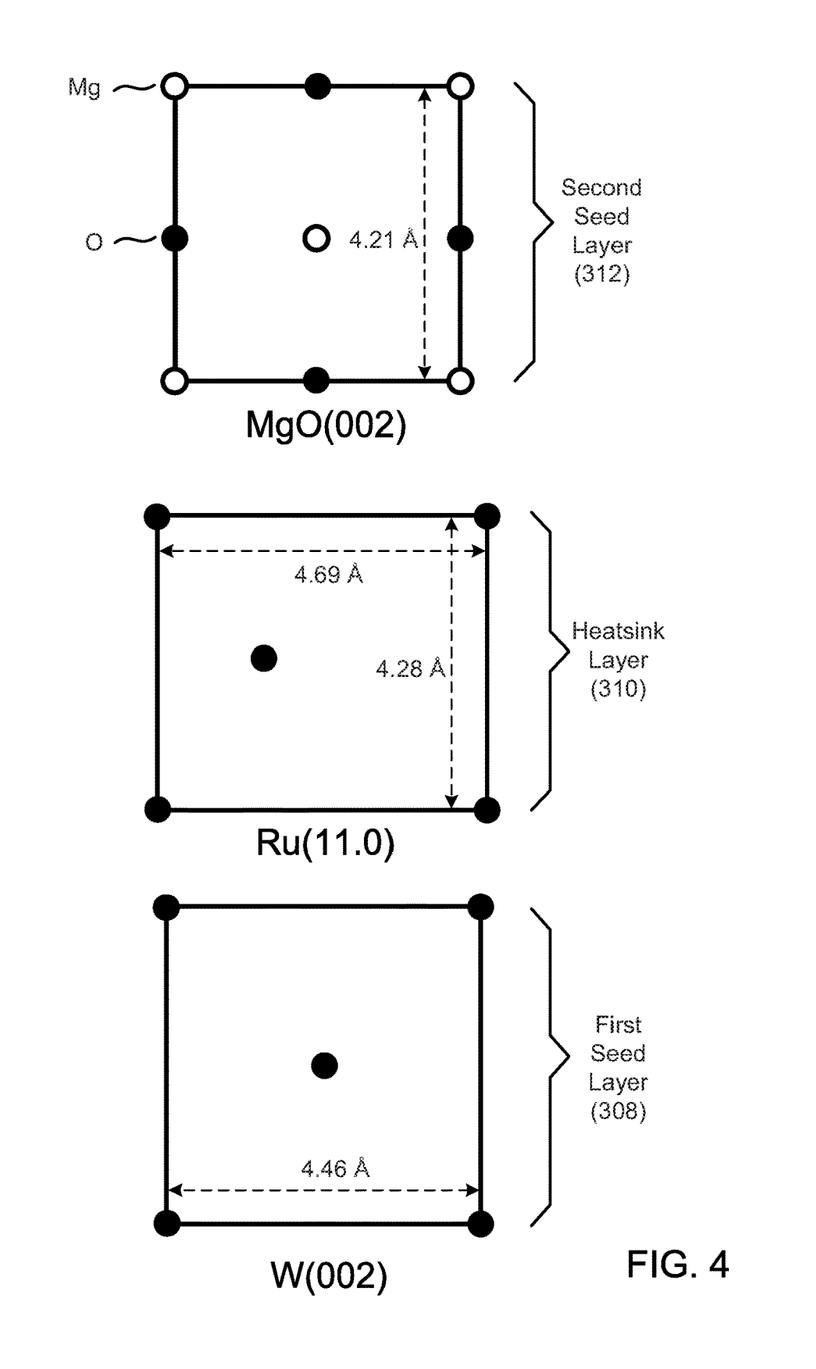
FIG. 4 is a schematic view of the crystal structure of several layers of a HAMR magnetic medium including a heatsink configured to provide a high thermal gradient, a seed layer (W(002)) for the heatsink, and a seed layer (MgO(002)) for a recording layer in accordance with one embodiment of the disclosure.

The heatsink layer 210 can be made of Ru with a crystal texture of (11.0), which is equivalent to (11$\bar{2}$0). In some embodiments, the heatsink 210 can include the Ru (11.0) plus C, Pt, Pd, Ir, Ni, Co, carbon segregants, oxides (e.g., TiO2, SiO2), carbides, and/or nitrides. In one embodiment, the heatsink 210 includes Ru(11.0), B and TiO2 or other suitable oxides. In several embodiments, the materials and concentrations of the heatsink layer 210 can be used to tune the lattice parameters to be within a preselected range. In one embodiment, for example, the lattice parameters can be tuned to have a spacing in a first direction (e.g., y-axis direction) of 4.28 Angstroms and a spacing of 4.69 in a second direction (e.g., x-axis direction). FIG. 4 shows the crystal structure and spacing of a possible heatsink layer with Ru (11.0), and will be discussed in greater detail below. In one embodiment, the heatsink layer 210 has a thickness of 35 nanometers (nm) or greater.

In several embodiments, the (11.0) crystal texture of the heatsink layer 210 can be achieved with a suitable selection of materials for the first seed layer 208. For example, in one aspect, the first seed layer 208 can be made of W(002).

The second seed layer 212 can be made of one or more materials having a (002) crystal texture. In one embodiment, the second seed layer 212 can be made of MgO, MgTiON, TiO, TiON, TiN, TiC, TiOC, CrN, CrON, VN, VON, VC, VOC, ABO3 with a perovskite crystal structure, MgAl2O4 with a spinel crystal structure, and/or combinations thereof. In one embodiment, the second seed layer 212 can be made of MgO having a crystal texture of (002). In several embodiments, the second seed layer 212 acts as a seed layer, or orientation control layer, for the magnetic recording layer 214. In some embodiments, the second seed layer 212 can have a thickness of at least 2 nm. In one such embodiment, the second seed layer 212 can have a thickness of 3 to 5 nm, inclusive.

In some embodiments, the first seed layer 208 can be made of one or more materials having a (002) crystal texture, and the second seed layer 212 can be made of one or more materials having a (002) crystal texture. In one such embodiment, the second seed layer 212 is directly on the heatsink layer 210. In other embodiments, as discussed above, a buffer layer may be included between the heatsink layer 210 and the second seed layer 212. In such case, the buffer layer (e.g., acting as a strain matching layer) can be made of one or more materials such as MgTiO. In several embodiments, the buffer layer can improve epitaxy between the second seed layer 212 and the heatsink layer 210.

The magnetic recording layer 214 can be made of one or more materials such as FePt, CoPt, and/or FePd. In one aspect, the magnetic recording layer 214 can be made of $L1_0$ phase FePt. In some embodiments, the magnetic recording layer 214 can have a multi-layer structure.

The overcoat layer 216 can be made of one or more materials such as C and/or other suitable materials known in the art.

In one embodiment, the medium 200 may also include a capping layer between the MRL 214 and the overcoat 216. In such case, the capping layer can be made of one or more materials such as Co, Pt, Pd, CoFe, CoFeB, CoPt, combinations thereof, and/or other suitable materials known in the art.

In one embodiment, the medium 200 may also include a lubricant layer on the overcoat 216. In such case, the lubricant layer can be made of one or more materials such as a polymer based lubricant and/or other suitable materials known in the art.

FIG. 4 is a schematic view of the crystal structure of several layers of a HAMR magnetic medium including a heatsink configured to provide a high thermal gradient, a seed layer (W(002)) for the heatsink, and a seed layer (MgO(002)) for a recording layer in accordance with one embodiment of the disclosure. The first seed layer 308 is made of W with a (002) crystal texture and has a lattice constant/spacing of 4.46 Angstroms. As can be seen in FIG. 5, the W(002) with this lattice constant of 4.46 Angstroms allows for a lattice misfit of −5.2 percent in the horizontal direction (e.g., x-direction in Cartesian system) and a lattice misfit of 4.0 percent in the vertical direction (e.g., y-direction in Cartesian system). As such, the first seed layer 308 made of W(002) provides a suitable seed for the heatsink layer 310.

As can be seen in FIG. 4, the heatsink layer 310 is made of Ru with a (11.0) crystal texture. The heatsink layer 310 has a lattice constant/spacing of 4.69 Angstroms in the horizontal direction and a lattice spacing of 4.28 Angstroms in the vertical direction. Effectively, the heatsink layer 310 has the (11.0) crystal orientation normal to the film/media surface. This approach can allow MgO to grow directly on the heatsink, which has relatively high thermal conductivity. Other crystal orientations of Ru may need an amorphous layer for smoothing of the interface and to promote MgO growth. Rather than have the additional thickness of the amorphous layer, this approach also beneficially brings the magnetic recording layer closer to the heatsink to improve media thermal gradient and head to media spacing.

The second seed layer 312 is made of MgO with a (002) crystal texture and has a lattice spacing of 4.21 Angstroms in the vertical direction.

In one embodiment, the epitaxial relationship between these layers (308, 310, 312) can be expressed as follows:

W(002)//Ru(11.0)‖W[200]//Ru[00.2]

Ru(11.0)//MgO(002)‖Ru[00.2]//MgO[200]

FIG. 5 is a table 400 illustrating possible seed layer materials for a heatsink layer configured to provide a high thermal gradient and corresponding seed layer characteristics such as lattice constant and lattice mismatch with the heatsink layer in accordance with one embodiment of the disclosure. The seed layer materials 402 are shown in the first column. The corresponding lattice constants 404 are shown in the second and third columns. The corresponding percentage lattice misfit 406 in the horizontal or x-direction is shown in the fourth column. The corresponding percentage lattice misfit 408 in the vertical or y-direction is shown in the fifth column. Any of these materials may be suitable for use as the first seed layer 208 of FIG. 3. In some embodiments, W and Mo may work best as the first seed layer 208 of FIG. 3 given the desirable lattice misfit parameters.

Figure 6:
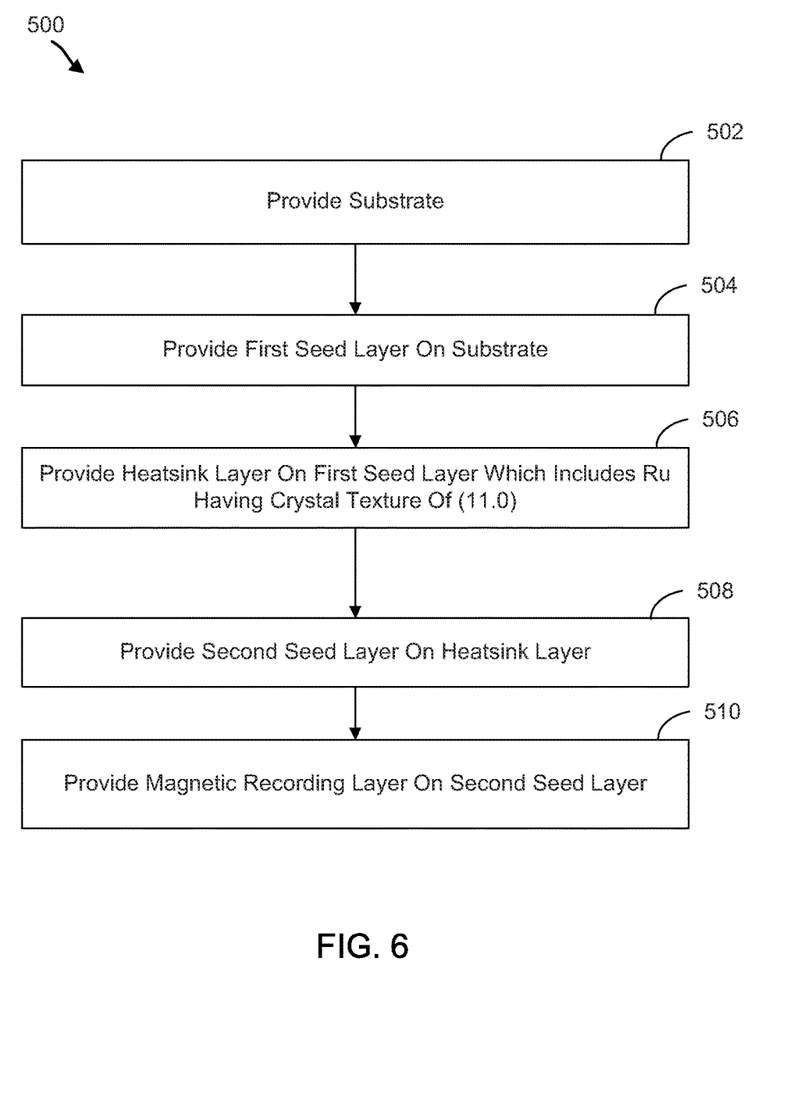
FIG. 6 is a flowchart of a process for manufacturing a HAMR magnetic medium with a heatsink configured to provide a high thermal gradient in accordance with one embodiment of the disclosure.

FIG. 6 is a flowchart of a process 500 for manufacturing a HAMR magnetic medium with a heatsink configured to provide a high thermal gradient in accordance with one embodiment of the disclosure. In particular embodiments, the process 500 can be used to manufacture the magnetic medium 200 of FIG. 3.

In block 502, the process provides a substrate. In block 504, the process provides a first seed layer on the substrate. In some embodiments, the process may provide a pre-seed layer on the substrate prior to the first seed layer. In block 506, the process provides a heatsink layer on the first seed layer and including Ru with a crystal texture of (11.0). In block 508, the process provides a second seed layer on the heatsink layer. In block 510, the process provides a magnetic recording layer on the second seed layer. In several embodiments, the process may also provide additional layers such as those described above for the magnetic medium 200 of FIG. 3. In several embodiments, the materials for the layers formed in process 500 can be those described above for the corresponding layers of the medium 200 of FIG. 3.

In one embodiment, the heatsink can be deposited in block 506 using sputtering with a standard low pressure (e.g., using less than 5 millitor with Argon gas) and without bias. In one aspect, it can be preferable to deposit the heatsink using a low sputter pressure. In one embodiment, the heatsink can be deposited using minimal or no heating during the deposition. In another embodiment, the heatsink can be deposited with an applied heat of about 300 to 400 degrees Celsius. In one embodiment, the heatsink can be deposited with a suitable bias voltage (e.g., −250 volts) applied to the substrate. In another example, the heatsink can be deposited using sputtering with a mix of Ar and $N_2$ gases.

In one embodiment, the process can perform the sequence of actions in a different order. In another embodiment, the process can skip one or more of the actions. In other embodiments, one or more of the actions are performed simultaneously. In some embodiments, additional actions can be performed.

In several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Figure 7:
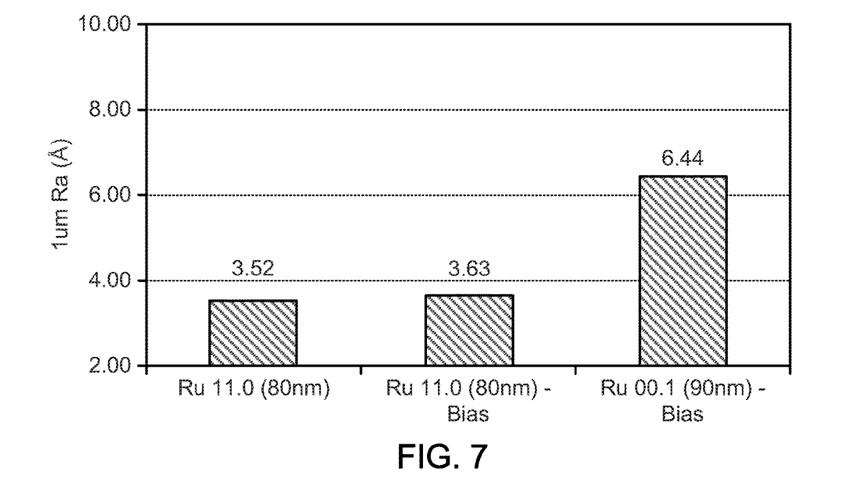
FIG. 7 is a bar graph of surface roughness for a heatsink layer configured to provide a high thermal gradient and made of Ru (11.0) with various deposition parameters as compared to a comparative heatsink made of Ru (00.1) in accordance with one embodiment of the disclosure.

FIG. 7 is a bar graph of surface roughness for a heatsink layer configured to provide a high thermal gradient and made of Ru (11.0) with various deposition parameters as compared to a comparative heatsink made of Ru (00.1) in accordance with one embodiment of the disclosure. The leftmost column shows a surface roughness of 3.52 Angstroms for Ru (11.0) at a thickness of 80 nm. The middle column shows a surface roughness of 3.63 Angstroms for Ru (11.0) at a thickness of 80 nm and deposited with a bias voltage during deposition. The rightmost column shows a surface roughness of 6.44 Angstroms for Ru (00.1), a different crystal texture, at a thickness of 90 nm and deposited with a bias voltage during deposition. As such, it can be observed that the heatsink made of Ru with the (11.0) crystal texture is much less rough than a comparative heatsink made of Ru with a different crystal texture.

Figure 8:
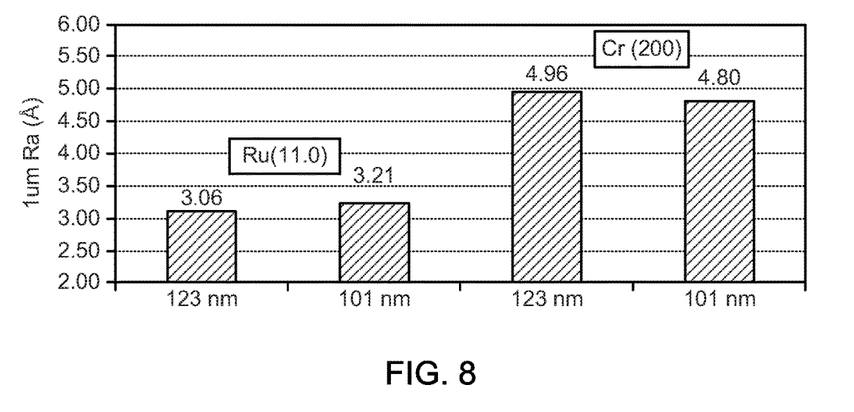
FIG. 8 is a bar graph of surface roughness for a heatsink layer configured to provide a high thermal gradient and made of Ru (11.0) with different thicknesses as compared to a comparative heatsink made of Cr (200) in accordance with one embodiment of the disclosure.

FIG. 8 is a bar graph of surface roughness for a heatsink layer configured to provide a high thermal gradient and made of Ru (11.0) with different thicknesses as compared to a comparative heatsink made of Cr (200) in accordance with one embodiment of the disclosure. The left two columns show the surface roughness of heatsinks made of Ru (11.0) at thicknesses of 123 nm and 101 nm. The right two columns show the surface roughness of a heatsink formed of Cr (200) at thicknesses of 123 nm and 101 nm. As can be observed from FIG. 8, the surface roughness of the Ru (11.0) heatsinks is substantially less than the surface roughness of the Cr (200) heatsinks.

Figure 9:
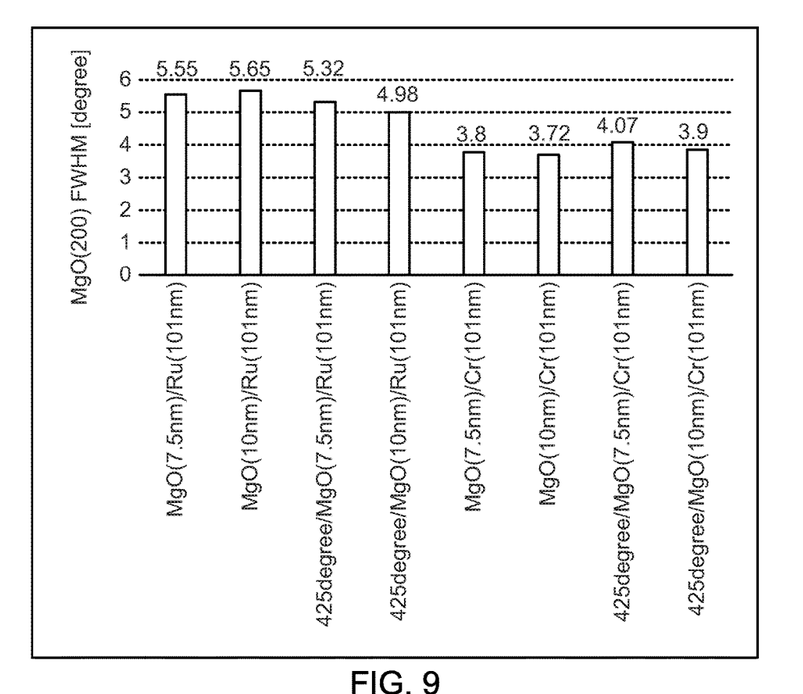
FIG. 9 is a bar graph of texture of a seed layer, made of MgO (200), for a recording layer with various thicknesses and deposition parameters over a heatsink layer made of either Ru or Cr in accordance with one embodiment of the disclosure.

FIG. 9 is a bar graph of texture of a seed layer, made of MgO (200), for a recording layer with various thicknesses and deposition parameters over a heatsink layer made of either Ru or Cr in accordance with one embodiment of the disclosure. The leftmost two columns show the MgO (200) seed layer, at thicknesses of 7.5 nm and 10 nm, on a Ru(11.0) heatsink with no heat applied during deposition. The next two columns show the MgO (200) seed layer, at thicknesses of 7.5 nm and 10 nm, on a Ru(11.0) heatsink with heat of 425 degrees K applied during deposition. The four rightmost columns show the same parameters except that the heatsink is formed of Cr. Thus, it can be observed from FIG. 9, that the texture of the MgO (200) seed layer on Ru (11.0) heatsinks is rougher than the texture of the MgO (200) seed layer on the Cr (200) heatsinks. This is due to the higher lattice mismatch between MgO and Ru as compared to the lattice mismatch between MgO and Cr. While the texture of the MgO (200) seed layer on Ru (11.0) heatsinks may be less desirable than that of the MgO (200) seed layer on Cr (200) heatsinks, the Ru (11.0) heatsinks may provide better thermal conductivity as will be discussed below.

Figure 10:
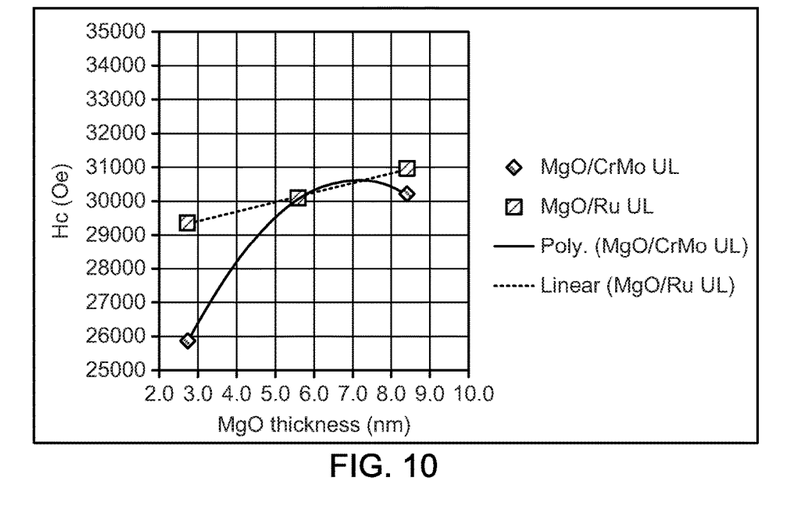
FIG. 10 is a graph of coercivity of a recording layer versus thickness of a MgO seed layer for a magnetic medium with a heatsink layer configured to provide a high thermal gradient and for a comparative magnetic medium in accordance with one embodiment of the disclosure.

FIG. 10 is a graph of coercivity (Hc) of a recording layer versus thickness of a MgO seed layer for a magnetic medium with a heatsink layer configured to provide a high thermal gradient and for a comparative magnetic medium in accordance with one embodiment of the disclosure. The heatsink layer configured to provide the high thermal gradient is made of Ru (11.0), while the comparative magnetic medium has a heatsink made of CrMo. As can be observed from FIG. 10, the coercivity of the medium with the Ru heatsink remains high and relatively consistent over a range of MgO thicknesses. This can allow the MgO seed layer to be made relatively thin without a concern for negatively impacting the magnetics (e.g., FePt magnetics) of the recording layer. On the other hand, the coercivity of the medium with the CrMo heatsink is strongly affected by the thickness of the MgO seed layer and is relatively low for small MgO seed layer thicknesses such as those in the range of 3 nm to 5 nm. The coercivity of the medium with the Ru heatsink is significantly higher in the same range. In a number of embodiments, it may be desirable to make the MgO seed layer as thin as possible to reduce the distance between the heatsink and the recording/read head.

In one aspect, FIG. 10 may viewed as showing that Ru does not appear to inter-diffuse with FePt such that MgO can possibly be made thinner without a concern for poisoning the FePt magnetics even if there are pin holes generated as the MgO seed layer is thinned.

Figure 11:
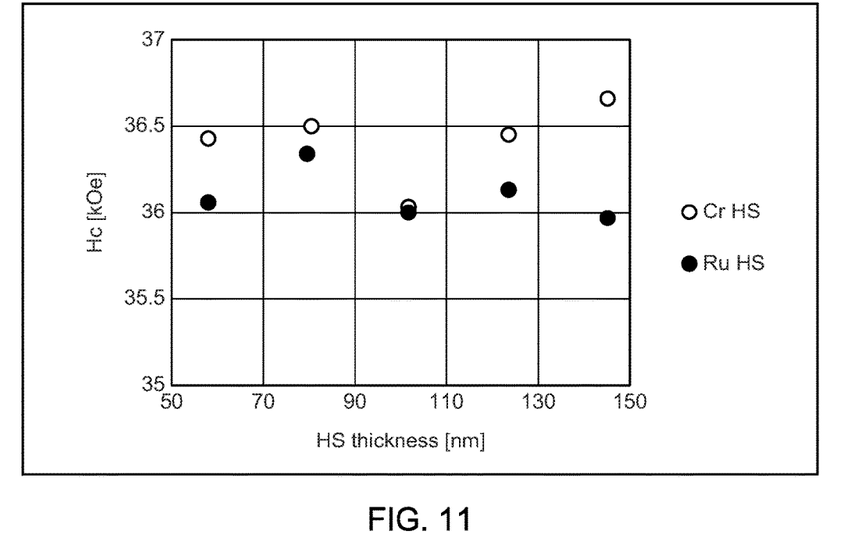
FIG. 11 is a graph of coercivity of a recording layer versus thickness of a heatsink layer for a magnetic medium configured to provide a high thermal gradient and for a comparative magnetic medium with a Cr heatsink in accordance with one embodiment of the disclosure.

FIG. 11 is a graph of coercivity of a recording layer versus thickness of a heatsink layer for a magnetic medium configured to provide a high thermal gradient and for a comparative magnetic medium with a Cr heatsink in accordance with one embodiment of the disclosure. The heatsink layer for the magnetic medium configured to provide a high thermal gradient is made of Ru (11.0) and the heatsink layer of the comparative magnetic medium is made of Cr. As can be observed from FIG. 11, the Cr heatsink provides slightly better coercivity (Hc) than the Ru heatsink at various thicknesses.

Figure 12:
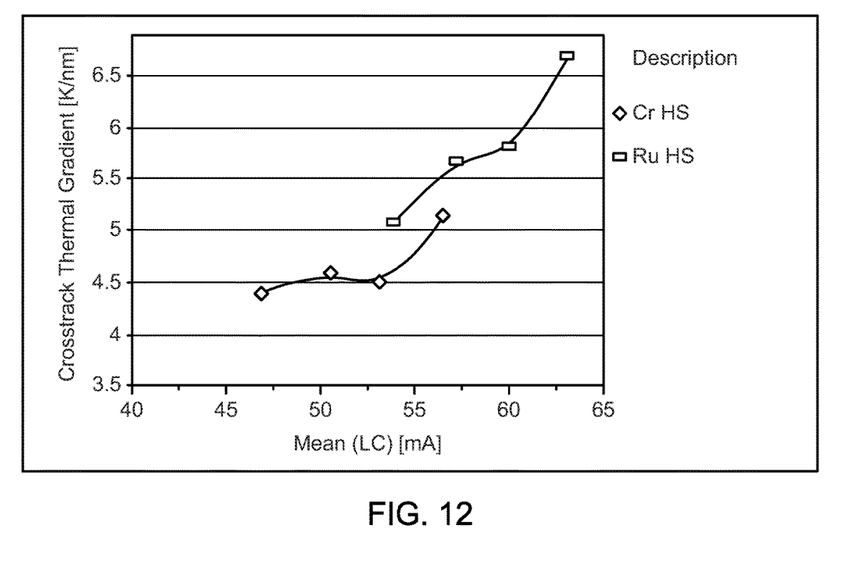
FIG. 12 is a graph of a crosstrack thermal gradient versus average laser current for a magnetic medium with a Ru heatsink layer configured to provide a high thermal gradient and a comparative magnetic medium with a Cr heatsink layer in accordance with one embodiment of the disclosure.

FIG. 12 is a graph of a crosstrack thermal gradient versus average laser current for a magnetic medium with a Ru heatsink layer configured to provide a high thermal gradient and a comparative magnetic medium with a Cr heatsink layer in accordance with one embodiment of the disclosure. The heatsink layer for the magnetic medium configured to provide a high thermal gradient is made of Ru (11.0) and the heatsink layer of the comparative magnetic medium is made of Cr. As can be observed from FIG. 12, the Ru heatsink provides better thermal gradient than the Cr heatsink at various values of the mean laser current, and particularly at relatively high values of the mean laser current.

Figure 13A:
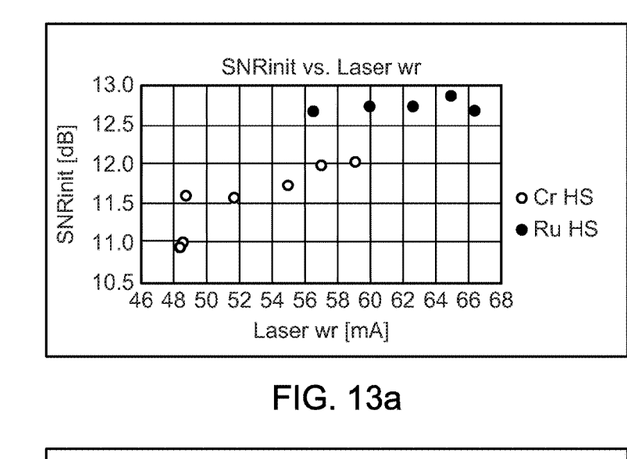
FIG. 13a is a graph of initial signal to noise ratio (SNR) versus laser current for a magnetic medium with a Ru heatsink layer configured to provide a high thermal gradient and a comparative magnetic medium with a Cr heatsink layer in accordance with one embodiment of the disclosure.

FIG. 13a is a graph of initial signal to noise ratio (SNR) versus laser current for a magnetic medium with a Ru heatsink layer configured to provide a high thermal gradient and a comparative magnetic medium with a Cr heatsink layer in accordance with one embodiment of the disclosure. The heatsink layer for the magnetic medium configured to provide a high thermal gradient is made of Ru (11.0) and the heatsink layer of the comparative magnetic medium is made of Cr. As can be observed from FIG. 13a, the Ru heatsink provides better initial SNR (i.e., before any adjacent track writes are performed) than the Cr heatsink at various values of the laser current.

Figure 13B:
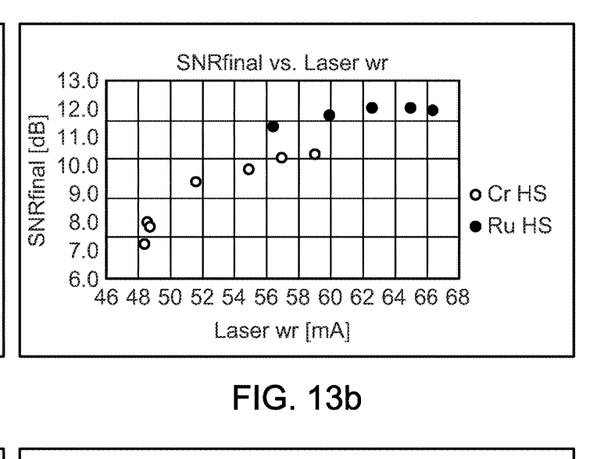
FIG. 13b is a graph of final SNR versus laser current for the magnetic mediums of FIG. 13a in accordance with one embodiment of the disclosure.

FIG. 13b is a graph of final SNR versus laser current for the magnetic mediums of FIG. 13a in accordance with one embodiment of the disclosure. As can be observed from FIG. 13b, the Ru heatsink provides better final SNR (i.e., after adjacent track writes are performed) than the Cr heatsink at various values of the laser current.

Figure 13C:
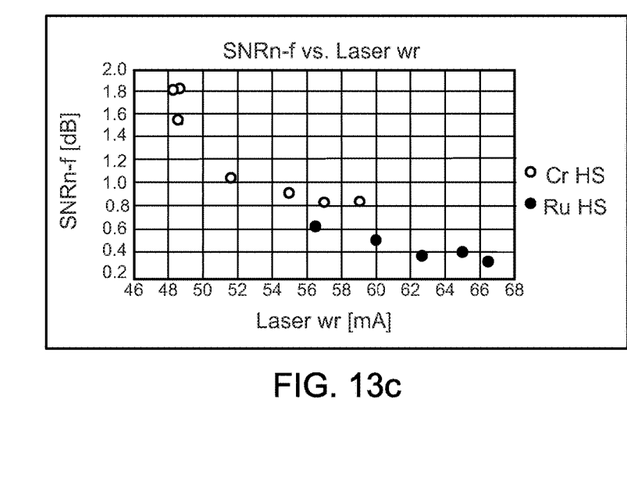
FIG. 13c is a graph of initial SNR minus final SNR versus laser current for the magnetic mediums of FIG. 13a in accordance with one embodiment of the disclosure.

FIG. 13c is a graph of initial SNR minus final SNR versus laser current for the magnetic mediums of FIG. 13a in accordance with one embodiment of the disclosure. As can be observed from FIG. 13c, the Ru heatsink provides better initial minus final SNR (i.e., degree of change in SNR even after adjacent track writes are performed) than the Cr heatsink at various values of the laser current. Stated another way, the Ru heatsink tested with more consistent values of initial and final SNR despite the adjacent track writes.

Figure 13D:
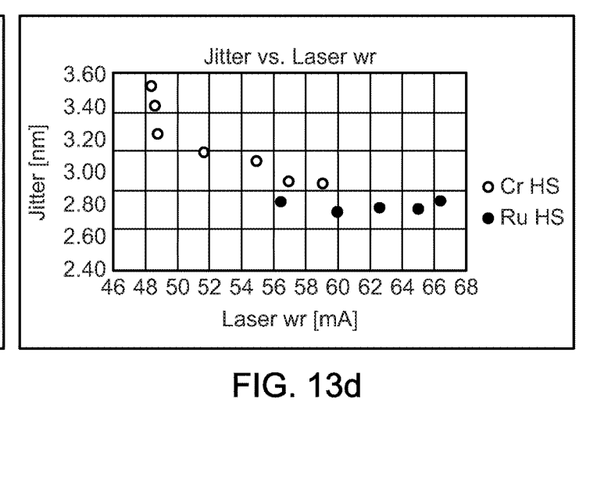
FIG. 13d is a graph of jitter versus laser current for the magnetic mediums of FIG. 13a in accordance with one embodiment of the disclosure.

FIG. 13d is a graph of jitter versus laser current for the magnetic mediums of FIG. 13a in accordance with one embodiment of the disclosure. As can be observed from FIG. 13d, the Ru heatsink provides consistently lower values of jitter than the Cr heatsink at various values of the laser current.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording medium for heat assisted magnetic recording, the medium comprising:
   a substrate;
   a first seed layer on the substrate;
   a heatsink layer on the first seed layer and comprising Ru having a crystal texture of (11.0);
   a second seed layer on the heatsink layer, wherein the second seed layer comprises a (002) crystal texture; and
   a magnetic recording layer on the second seed layer.

2. The medium of claim 1, wherein the first seed layer comprises a preselected crystal texture configured to facilitate growth of the crystal texture of the heatsink layer.

3. The medium of claim 1, wherein the first seed layer comprises one or more materials having a characteristic selected from the group consisting of a body center cubic (BCC) crystal structure, a B2 crystal structure, and a NaCl crystal structure.

4. The medium of claim 3, wherein the one or more materials of the first seed layer have a (002) crystal texture.

5. The medium of claim 1, wherein the first seed layer comprises one or more materials having a characteristic selected from the group consisting of (1) a body center cubic (BCC) crystal structure with a lattice constant greater than, or equal to, 3.02 Angstroms and less than, or equal to, 3.32 Angstroms, (2) a B2 crystal structure with a lattice constant greater than, or equal to, 3.02 Angstroms and less than, or equal to, 3.32 Angstroms, and (3) a NaCl crystal structure with a lattice constant greater than, or equal to, 4.28 Angstroms and less than, or equal to, 4.69 Angstroms.

6. The medium of claim 1:
   wherein the first seed layer comprises one or more materials selected from the group consisting of W—X, Mo, Mo—Y, Cr—Z, RuTi, CoHf, CoZr, RuHf, RuZr, TiC, TaN, TaC, NbC, ZrN, ZrC, and combinations thereof,
   wherein X is selected from the group consisting of Ru, Cr, and Mo,
   wherein Y is selected from the group consisting of Ru and Cr, and
   wherein Z is selected from the group consisting of Ru and Mo.

7. The medium of claim 1, wherein the first seed layer comprises W having a crystal texture of (002).

8. The medium of claim 1, wherein the second seed layer is directly on the heatsink layer.

9. The medium of claim 1, wherein the heatsink layer comprises RuX where X is selected from the group consisting of C, Pt, Pd, Ir, Ni, Co, carbon segregants, oxides, and combinations thereof.

10. The medium of claim 1, wherein the second seed layer comprises one or more materials having a (002) crystal texture.

11. A magnetic recording medium for heat assisted magnetic recording, the medium comprising:
    a substrate:
    a first seed layer on the substrate;
    a heatsink layer on the first seed layer and comprising Ru having a crystal texture of (11.0);
    a second seed layer on the heatsink layer, wherein the second seed layer comprises one or more materials selected from the group consisting of MgO, MgTiON, TiO, TiON, TiN, TiC, TiOC, CrN, CrON, VN, VON, VC, VOC, ABO3 with a perovskite crystal structure, MgAl2O4 with a spinel crystal structure, and combinations thereof; and
    a magnetic recording layer on the second seed layer.

12. The medium of claim 1:
    wherein the first seed layer comprises one or more materials having a (002) crystal texture,
    wherein the second seed layer comprises one or more materials having a (002) crystal texture, and
    wherein the second seed layer is directly on the heatsink layer.

13. The medium of claim 1, wherein the magnetic recording layer comprises an alloy selected from the group consisting of FePt, CoPt, and FePd.

14. The medium of claim 1 further comprising:
    an adhesion layer on the substrate;
    a pre-seed layer on the adhesion layer, wherein the first seed layer is on the pre-seed layer; and
    an overcoat layer on the magnetic recording layer.

15. A method for manufacturing a magnetic recording medium for heat assisted magnetic recording, the method comprising:
    providing a substrate;
    providing a first seed layer on the substrate;
    providing a heatsink layer on the first seed layer and comprising Ru having a crystal texture of (11.0);
    providing a second seed layer on the heatsink layer and comprising a (002) crystal texture; and
    providing a magnetic recording layer on the second seed layer.

16. The method of claim 15, wherein the first seed layer comprises one or more materials having a characteristic selected from the group consisting of a body center cubic (BCC) crystal structure, a B2 crystal structure, and a NaCl crystal structure.

17. The method of claim 15, wherein the first seed layer comprises W having a crystal texture of (002).

18. The method of claim 15, wherein the second seed layer comprises one or more materials having a (002) crystal texture.

19. The method of claim 15:
wherein the first seed layer comprises one or more materials having a (002) crystal texture,
wherein the second seed layer comprises one or more materials having a (002) crystal texture, and
wherein the second seed layer is directly on the heatsink layer.

20. The method of claim 15 further comprising:
providing an adhesion layer on the substrate;
providing a pre-seed layer on the adhesion layer, wherein the first seed layer is on the pre-seed layer; and
providing an overcoat layer on the magnetic recording layer.

\* \* \* \* \*